(12) United States Patent
Roes et al.

(10) Patent No.: US 7,950,812 B2
(45) Date of Patent: May 31, 2011

(54) SHUTTERS FOR INFRA RED COMMUNICATION AT MODERATE BANDWIDTHS

(75) Inventors: John B. Roes, San Diego, CA (US); Gennady Tartakovsky, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 1005 days.

(21) Appl. No.: 11/621,954

(22) Filed: Jan. 10, 2007

(65) Prior Publication Data
US 2007/0273948 A1 Nov. 29, 2007

Related U.S. Application Data

(60) Provisional application No. 60/758,014, filed on Jan. 11, 2006.

(51) Int. Cl.
*G02B 5/124* (2006.01)
*G02F 1/00* (2006.01)
(52) U.S. Cl. ............... 359/529; 359/222.1; 359/237; 398/118
(58) Field of Classification Search .......... 359/222.1, 359/237, 285, 529–530; 398/118, 169–170
See application file for complete search history.

(56) References Cited

U.S. PATENT DOCUMENTS

| | | | |
|---|---|---|---|
| 3,833,893 | A | 9/1974 | Rajchman |
| 4,517,569 | A | 5/1985 | Gerharz |
| 5,221,987 | A | 6/1993 | Laughlin |
| 5,355,241 | A | 10/1994 | Kelley |
| 2001/0013967 | A1 | 8/2001 | Tsumura |

FOREIGN PATENT DOCUMENTS

| | | |
|---|---|---|
| DE | 196 52 920 A1 | 4/1998 |
| WO | WO 99/47950 A2 | 9/1999 |

*Primary Examiner* — James Phan
(74) *Attorney, Agent, or Firm* — Kilpatrick Townsend & Stockton LLP

(57) ABSTRACT

A modulating corner-cube retroreflector for remote communications is disclosed. The modulating corner-cube retroreflector includes a solid retroreflector with a front surface and three mutually perpendicular surfaces: a first surface, a second surface and a third surface. A first thin membrane is disposed relative to at least one of the three mutually perpendicular surfaces and covers at least a portion of the surface. A modulator is included that is adapted to cause the thin membrane to vibrate. The corner-cube retroreflector is configured to receive an incident beam of light from a source along a first path and is configured to return a reflected beam of light back towards the source along a second path that is substantially parallel to the first path. The first thin membrane is configured to substantially frustrate total internal reflection of the incident beam of light when the first thin membrane is moved relative to at least one surface of the retroreflector.

14 Claims, 11 Drawing Sheets

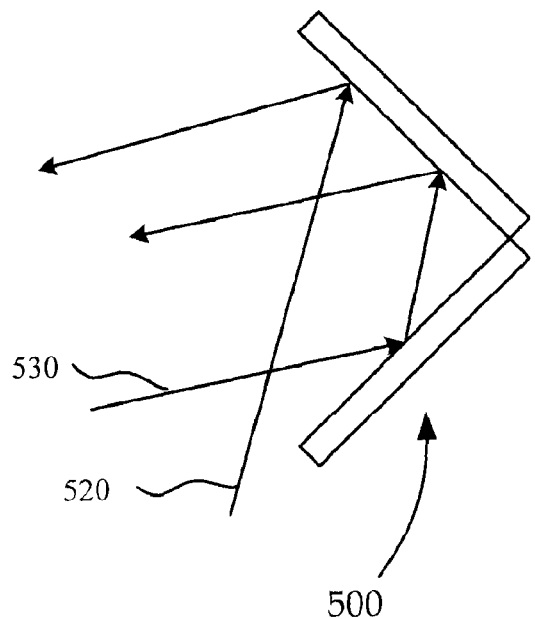
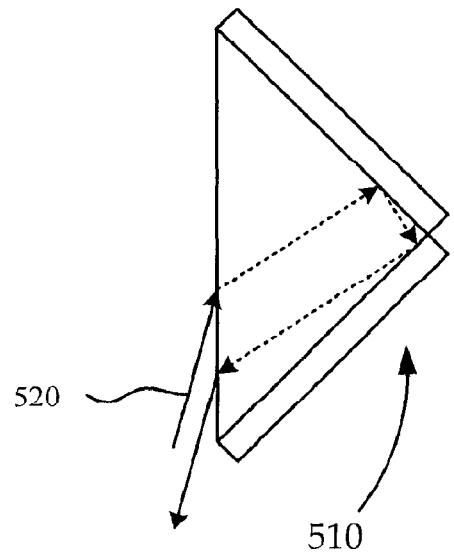
FIG. 5A
FIG. 5B
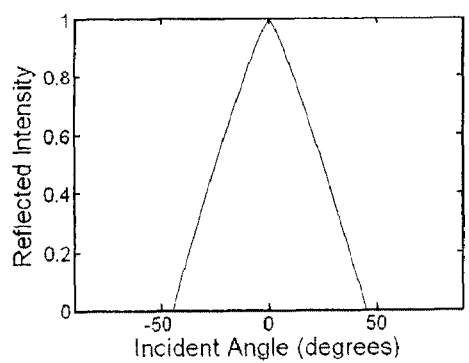
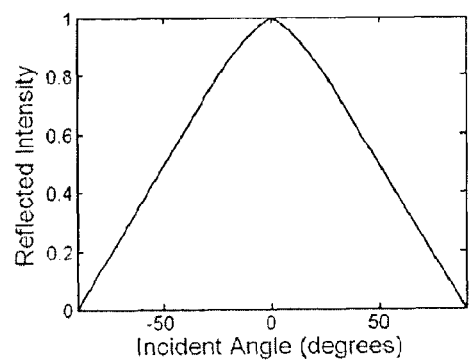
FIG. 5C
FIG. 5D

SHUTTERS FOR INFRA RED COMMUNICATION AT MODERATE BANDWIDTHS

CROSS-REFERENCES TO RELATED APPLICATIONS

This application claims the benefit of and is a non-provisional of co-pending U.S. Provisional Application Ser. No. 60/758,014 filed on Jan. 11, 2006, which is hereby expressly incorporated by reference in its entirety for all purposes.

BACKGROUND OF THE INVENTION

This disclosure relates in general to free-space communications systems and, but not by way of limitation, to retroreflector modulation of incident light for communication amongst other things.

Modulating retroreflectors provide a self-aligned return signal for a downstream data link in free space optical communications, such as satellite-to-ground, ground-to-satellite, and ground-to-ground transmission of optical data and signals. The optical power demands for the upstream and downstream signal are satisfied at the base station, permitting the remote station to communicate with greatly reduced power demands.

In such communications systems the signal from the remote station to the base station occurs without broadcasting the signal over a large area. Only receivers within the line of sight between the remote station and the base station can receive the return signal. This narrow return communications window, permits the remote station to remain quiet to others while successfully communicating to the base station.

Modulating retroreflectors have been designed with various technologies such as using a multiple quantum well modulator (MQW) or a liquid crystal (LC) modulator with a solid retroreflector or mechanically tilting the mirrors, and defocusing or diffracting reflected light in a hollow retro reflector. While such systems have been shown to work, they have their limitations such as high fabrication costs associated with MQW modulators and the slow modulation LC modulators. While the modulation schemes used with hollow retroreflectors perform quite well the hollow retroreflector has a limited field of view for receiving an incident beam of light.

BRIEF SUMMARY OF THE INVENTION

In one embodiment, the present disclosure provides for a modulating corner-cube retroreflector for remote communications. The modulating corner-cube retroreflector may include a solid or hollow retroreflector with a front surface and three mutually perpendicular surfaces: a first surface, a second surface and a third surface. A first thin membrane is disposed relative to at least one of the three mutually perpendicular surfaces and covers at least a portion of the surface. A modulator is included that is adapted to cause the thin membrane to vibrate. The corner-cube retroreflector is configured to receive an incident beam of light from a source along a first path and is configured to return a reflected beam of light back towards the source along a second path that is substantially parallel to the first path. The first thin membrane is configured to substantially frustrate total internal reflection of the incident beam of light when the first thin membrane is moved relative to at least one surface of the retroreflector.

In another embodiment, the present disclosure provides a modulating corner-cube retroreflector for remote communications. The corner-cube retroreflector includes a front surface and three mutually perpendicular surfaces. The modulating corner-cube retroreflector also includes a thin membrane disposed relative to at least one of the front surface and the three mutually perpendicular surfaces and spans at least a portion of at least one of the front surface and the three mutually perpendicular surfaces. The corner-cube retroreflector is configured to receive an incident beam of light from a source along a first path and configured to return a reflected beam of light back towards the source along a second path that is substantially parallel to the first path. The thin membrane is configured to substantially frustrate total internal reflection of the incident beam of light when the thin membrane is positioned at a first distance relative to at least one of the front surface and the three mutually perpendicular surfaces of the retroreflector. The thin membrane is configure to substantially permit total internal reflection when the thin membrane is positioned at a second distance relative to at least one of the front surface and the three mutually perpendicular surfaces of the retroreflector and the first distance is different from the second distance.

In yet another embodiment, the present disclosure provides a method for receiving a first beam of light along a first path and returning a second beam of light along a second path that is substantially parallel to the first path. The method also includes receiving the first beam of light from along the first path with a retroreflector, reflecting light with the retroreflector; vibrating a thin membrane disposed near a surface of the retroreflector to intermittently frustrate total internal reflectance of the first beam of light to produce the second beam of light; and returning the second beam of light along the second path. The vibrating step causes modulation of information on the second beam of light.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 5A and 5B show the path of incident and reflected light at both solid and hollow retroreflectors according to one embodiment of the invention;

FIGS. 5C and 5D show graphs of incident angle versus reflected intensity for hollow and solid retro reflectors according to one embodiment of the invention;

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Retroreflectors are optical devices that receive incident light and reflect reflected light back in the same direction as the incident light. Unlike mirrors, which reflect light back toward the source only if the light is incident on the mirror at a right angle to the surface of the mirror, retroreflectors may reflect light back toward a source through a range of incident angles.

Figure 1A:
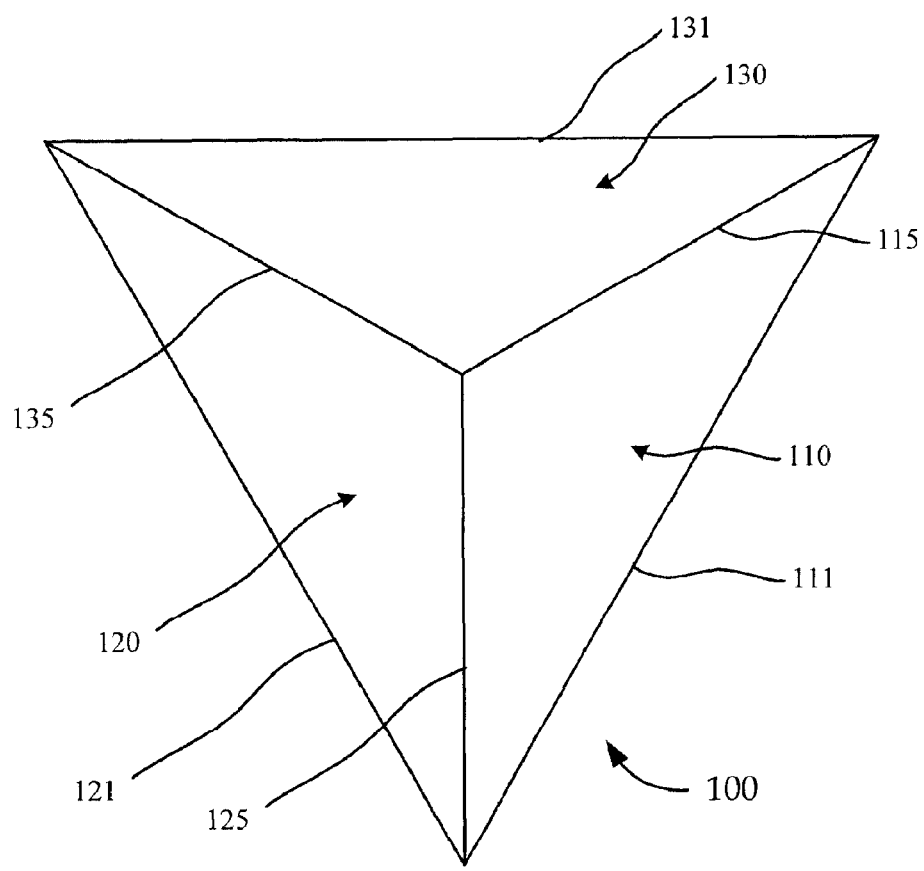
FIGS. 1A and 1B show views of a solid corner-cube retroreflector.
Figure 1B:
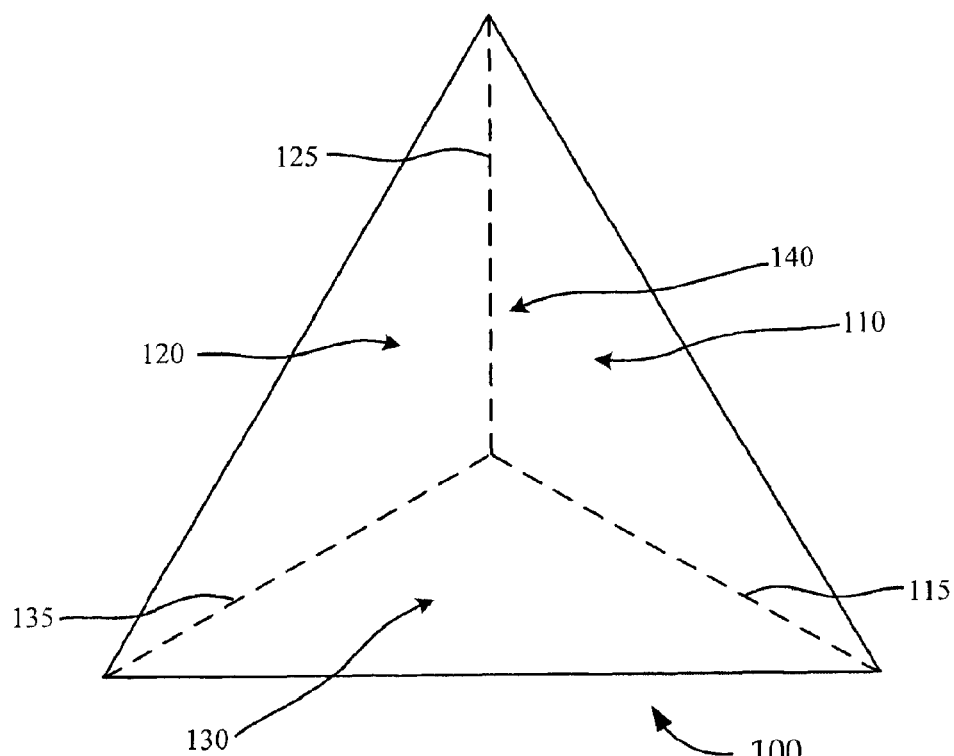
Figure 2:
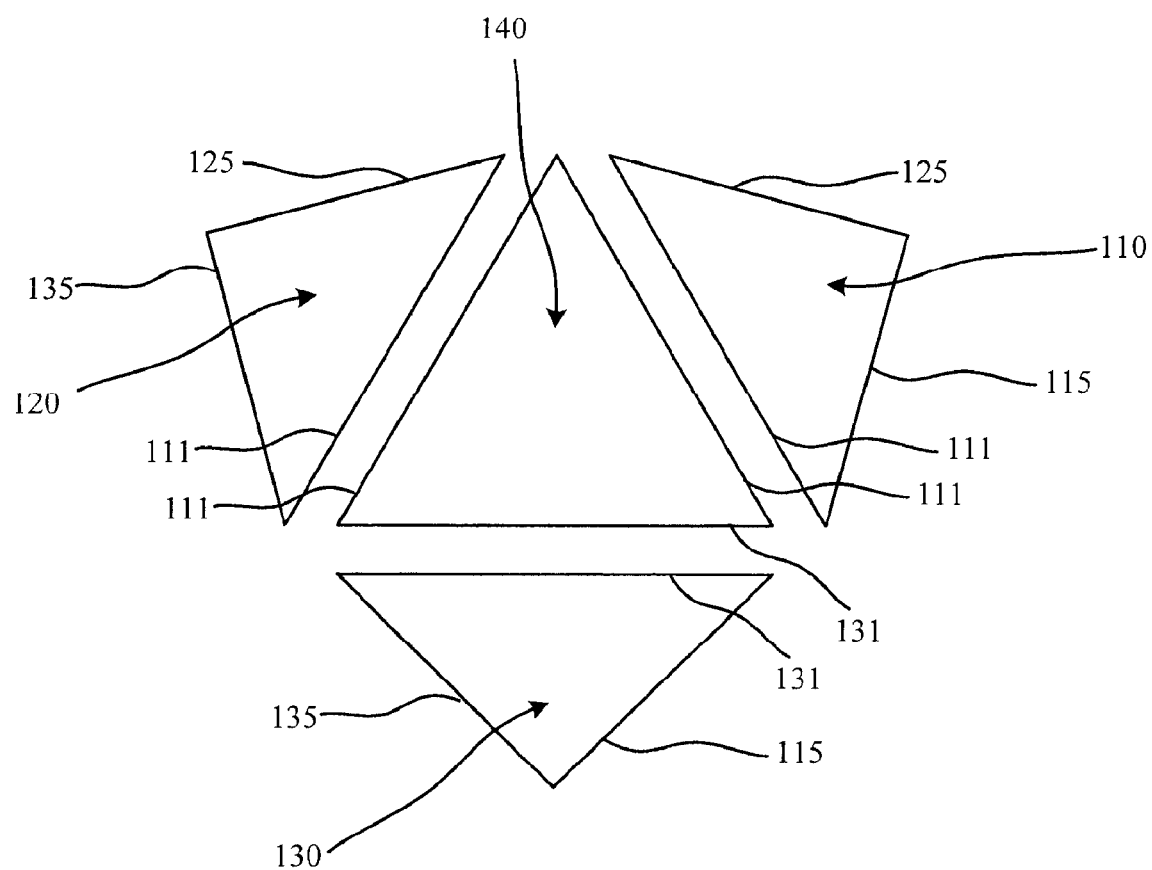
FIG. 2 shows an exploded view of the four surfaces of a solid corner-cube retroreflector shown in FIGS. 1A and 1B according to one embodiment of the invention.

There are many retroreflector designs. The corner-cube retroreflector is an optical element with three mutually perpendicular surfaces and may be solid or hollow. FIGS. 1A and 1B show views of one embodiment of a solid corner-cube retroreflector 100. Three mutually perpendicular flat surfaces 110, 120, 130 are shown with a flat front surface 140. Each of the surfaces are flat and smooth. Polishing may be used to achieve the desired surface smoothness. Each surface 110, 120, 130, 140 share an edge with every other surface. Surface 110 is perpendicular to surface 120 along edge 125, is perpendicular to surface 130 along edge 115, and is contiguous with surface 140 along edge 111. Surface 140 is perpendicular to surface 130 along edge 135 and contiguous with surface 140 along edge 121. Surface 130 is contiguous with surface 140 along edge 131. FIG. 2 shows an exploded view 200 of each of these four surfaces 110, 120, 130, 140.

Figure 3:
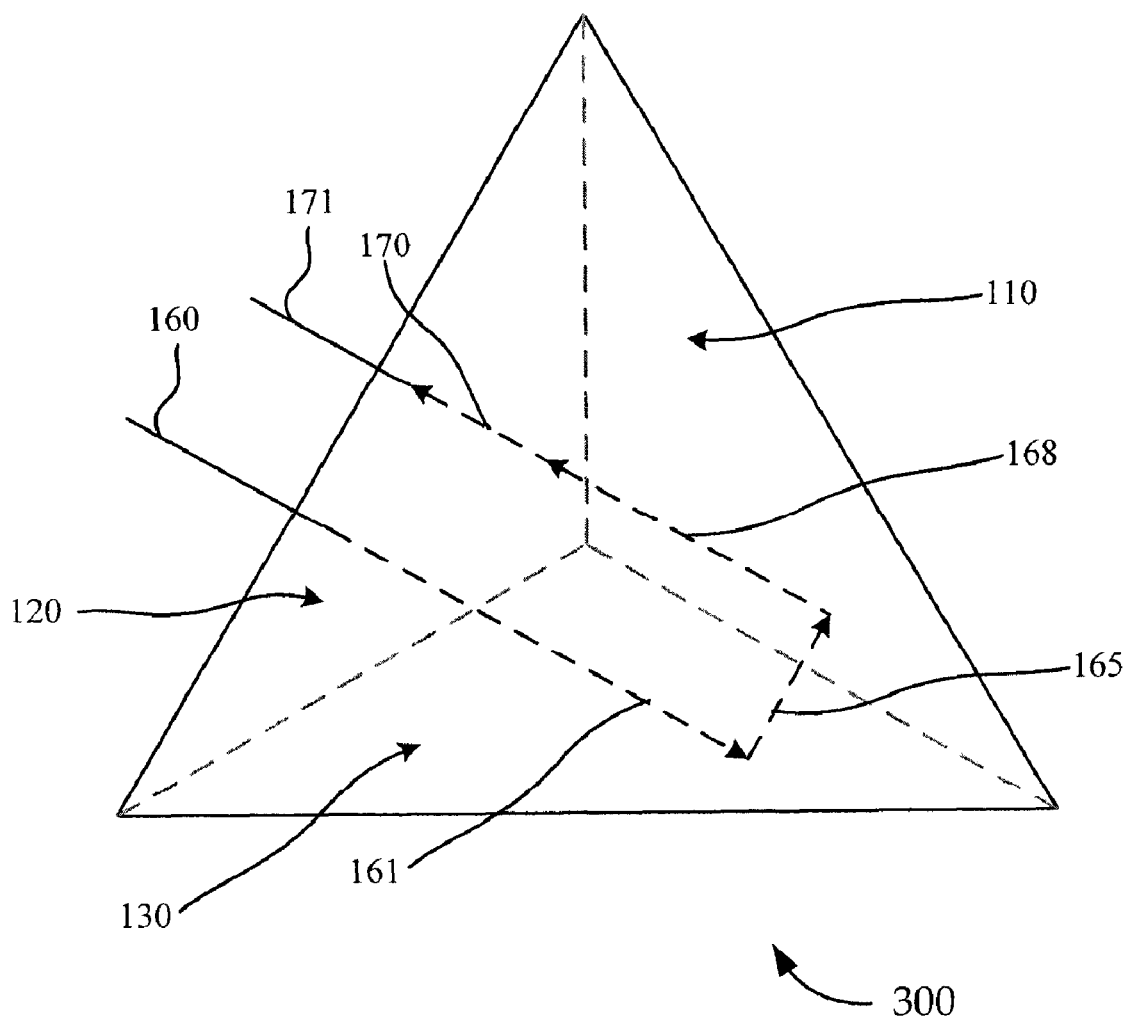
FIG. 3 shows the path of incident light as it is reflected from within a solid corner-cube retroreflector according to one embodiment of the invention.

FIG. 3 shows an exemplary path of light being reflected within a solid retroreflector 300 according to one embodiment of the invention. Incident light 160 is incident on front surface 140 and enters the retroreflector and continues along a path 161 of the incident light 160. The light 161 within the retroreflector is then reflected with surface 130 after which the light 165 is reflected by surface 110. The light 168 is then reflected by surface 120. Finally, the light 170 exits the retroreflector through front surface 140 as a reflected beam of light 171. Depending on the incident angle with respect to the front surface 140, the light may reflect from one, two or three of the mutually perpendicular flat surfaces 110, 120, 130.

A solid retrorefilector operates on the basis of total internal reflection. Total internal reflection occurs when the angle of incidence measured from the normal between a surface of the retroreflector and the path of light is greater than the critical angle. Refraction of light will generally occur at an interface between two materials with different indices of refraction. The angle of refraction depends on the incident angle and is governed by Snell's law:

$$n_1 \sin \Theta_1 = n_2 \sin \Theta_2.$$

where $n_1$ can be the refractive index in air, $n_2$ can be the refractive index in the retroreflector, and the angles, $\theta_1$ and $\theta_2$, are measured in the respective media from the normal to the interface. Because, the index of refraction of air ($n_{air}$) is less than index of refraction of the retroreflector ($n_{retro}$), the critical angle of the interface, $\theta_c$, is given by:

$$\Theta_C = \sin^{-1}\left(\frac{n_{air}}{n_{retro}}\right).$$

For example, in the case where $n_{air}$ is approximately equal to 1.0 and $n_{retro}$ is approximately equal to 1.5, corresponding to a typical index for glass, the critical angle is approximately 41.8 degrees. In a case such as this, the incident angle of light path must be greater than 41.8 degrees for total internal reflection to occur at the retroreflector-air interface. Furthermore, for the case of a solid silicon retroreflector the index of refraction is about 3.628, corresponding to a critical angle of 16 degrees. Accordingly, light incident on surfaces 110, 120, and 130 of the retroreflector at an angle greater than 16 degrees from the normal will be totally reflected. The higher the index of refraction the smaller the critical angle and thus permitting a greater range of incident angles that translate into totally reflected light.

A solid corner-cube retroreflector may comprise any material with the optical properties necessary to permit reflection and transmission of light. The retroreflector may be constructed of glass, plastic or silicon. Other materials known in the art with similar optical properties may also be used. In a specific embodiment the retroreflector may comprise solid silicon with an index of refraction of about 3.6 at 1550 nm. As discussed above, a material with a high index of refraction may be used to increase the range of angles producing total internal reflection. A variety of materials may be used with sufficiently high index of refraction to permit use for a variety of applications.

Figure 4A:
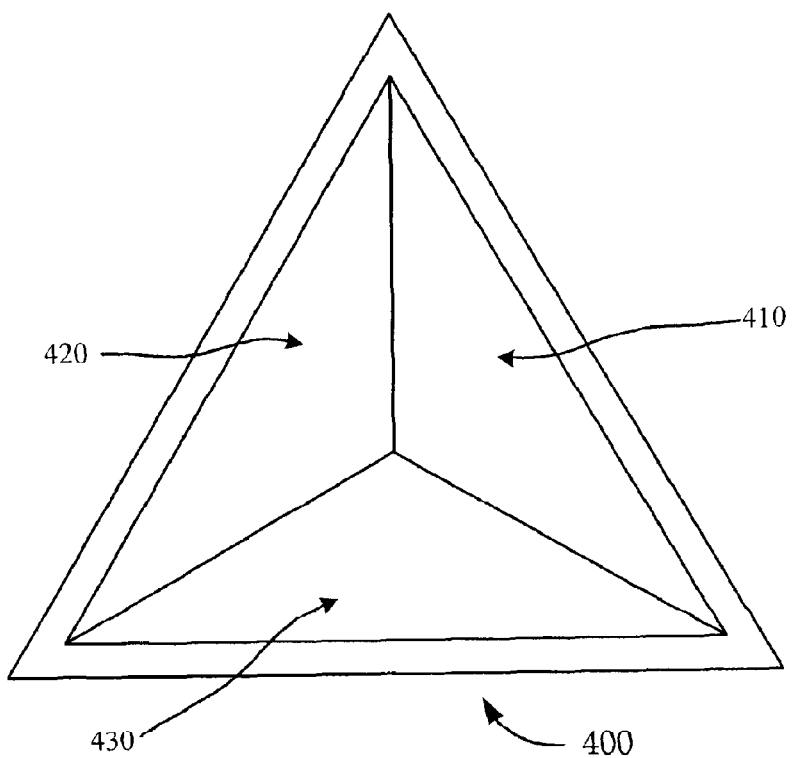
FIGS. 4A and 4B show a hollow retroreflector according to one embodiment of the invention.
Figure 4B:
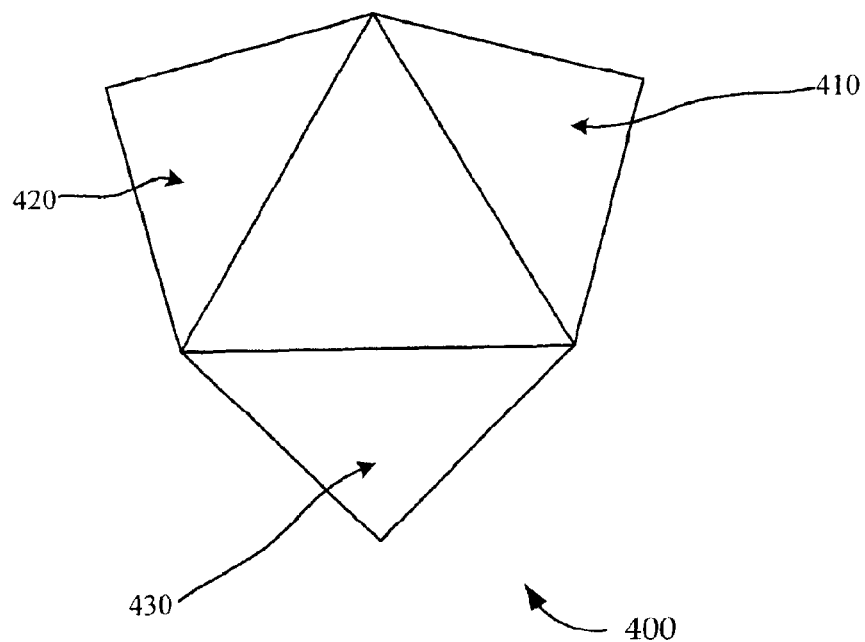

Other types of retroreflectors may be used with the embodiments of the present invention. For example, FIGS. 4A and 4B show an exemplary hollow retroreflector 400. As shown in FIG. 4A the hollow retroreflector 400 includes three mutually perpendicular mirrors 410, 420, 430. FIG. 4B shows an exploded view of the retroreflector 400 and the three surfaces 410, 420, 430. Spherical retroreflector may also be used in some embodiments.

A solid retroreflector accepts light from greater field of view. FIG. 5A shows light 520 and 530 incident on a hollow retroreflector 500. As shown, incident light 530 is reflected toward the source, and incident light 520 is not reflected back toward the source of the incident light 520. FIG. 5B shows light incident on a solid retroreflector 510 from the same angle. In this case, the incident is reflected back toward the source of the incident light 520. FIGS. 5C and 5D show graphs plotting the angle of incident versus intensity of reflected light for a hollow 500 and solid 510 retroreflector respectfully. As shown in the figures, a solid corner-cube retroreflector reflects light back toward a source from a broader range of incident angles than a hollow corner-cube retroreflector.

A retroreflector may modify a beam of incident light from a source and return a reflected beam with one or more interruptions that represent a communications signal to the source. A thin-film membrane across at least one surface of the retroreflector may frustrate total internal reflectance at a surface of the retroreflector when the thin-film membrane as the membrane is moved closer to the surface. The thin-film membrane may include silicon carbide. By modulating the gap between a thin-film membrane and a retroreflector, causing frustration of total internal reflection, interruptions may be placed in a reflected beam of light and used to communicate a signal back to a source. More than one surface may modulate a signal using thin-film membranes. All three mutually perpendicular surfaces may include thin-film membranes in order to produce a stronger signal within the reflected beam of light. Moreover, each of the three mutually perpendicular surfaces may be designed to frustrate light at different wavelengths, and therefore, increase the bandwidth of the signal within the reflected beam of light.

Figure 6:
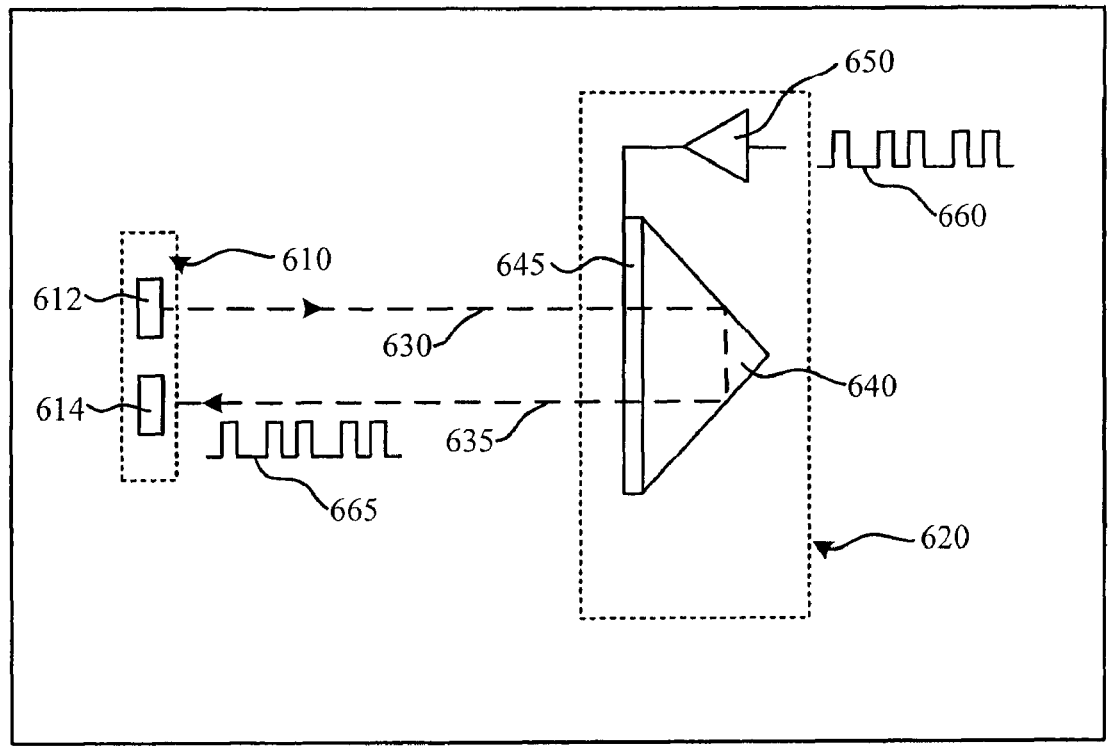
FIG. 6 shows a free-space communications system employing a retroreflector with a thin-film membrane near the front surface of the retroreflector according to one embodiment of the invention.
Figure 7:
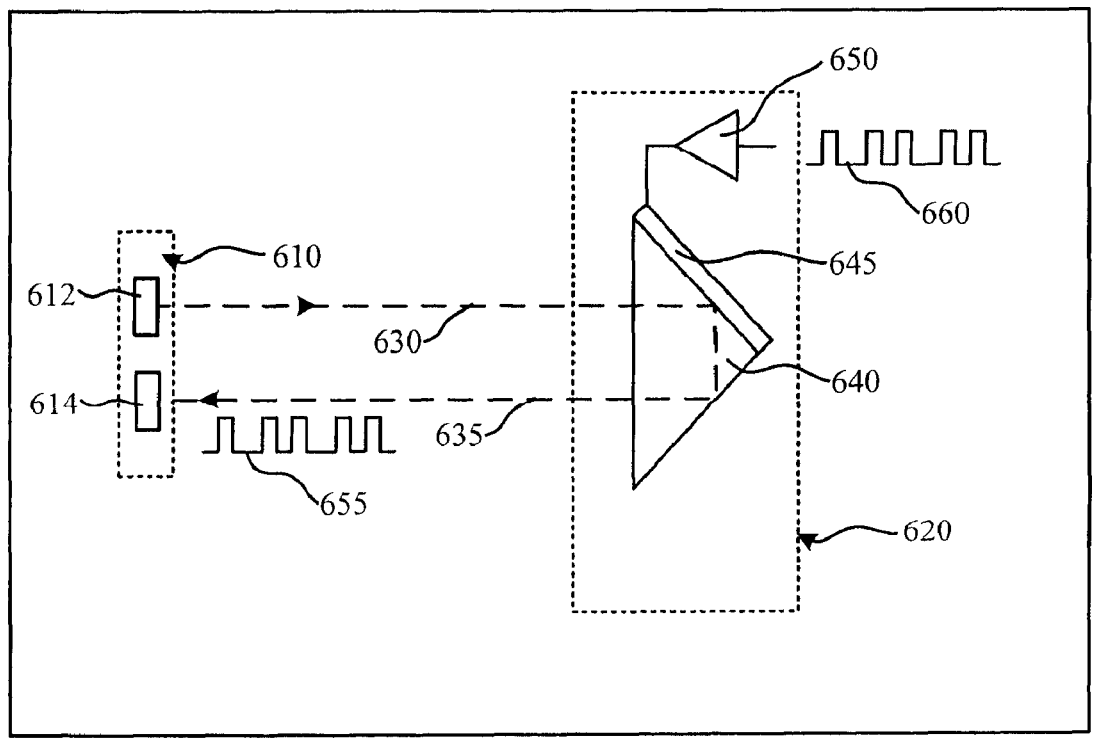
FIG. 7 shows a free-space communications system employing a retroreflector with a single thin-film membrane near one mutually perpendicular surface of the retroreflector according to one embodiment of the invention.
Figure 8:
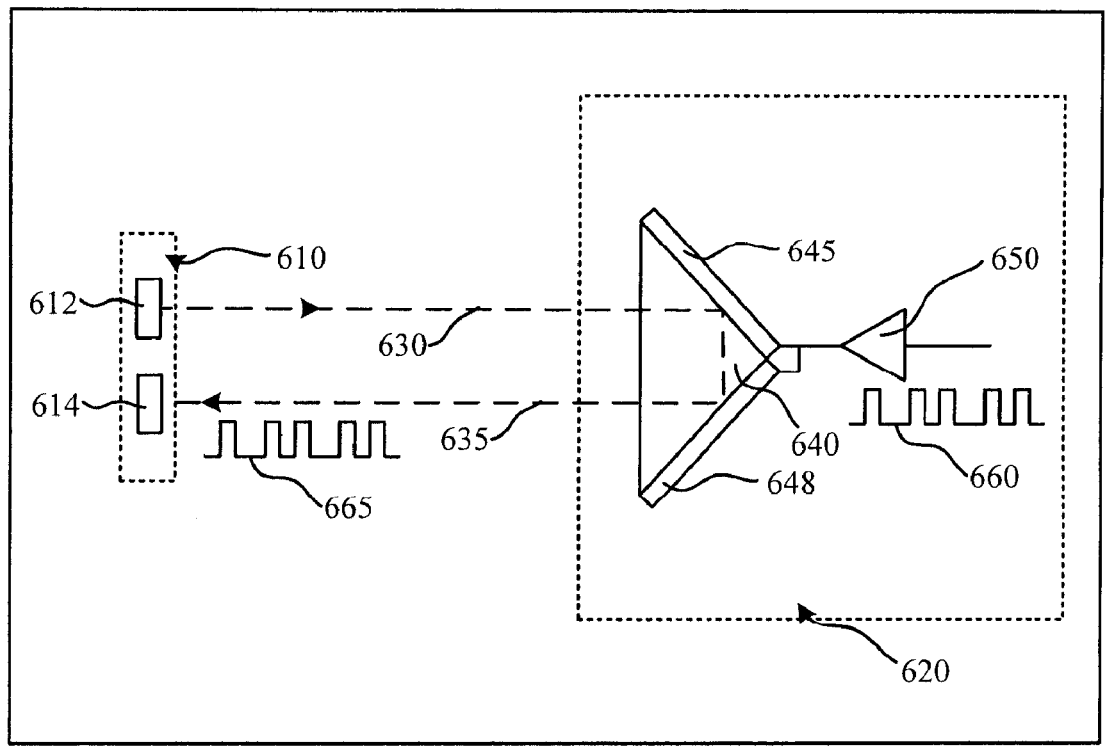
FIG. 8 shows a free-space communications system employing a retroreflector with a thin-film membrane near more than one of the mutually perpendicular surfaces of the retroreflector according to one embodiment of the invention.

Retroreflectors 640 may be used in free-space communication by providing a self-aligned return signal as shown in FIGS. 6, 7, and 8. In such free-space communication systems 600, 700, 800, a base station 610 may transmit a beam of substantially monochromatic light 630 from a light source 612. The light source 612, for example, may include a laser. The transmitted light 630 is directed toward a remote system 620 that includes a retroreflector 640 and a modulator 650. The retroreflector reflects the light back towards the transmitter along path 635.

In the embodiment shown in FIG. 6, the retroreflector 640 includes a modulating surface 645 on the front of the retroreflector 640. The modulating surface is driven by a modulator 650 that activates the modulating surface 645 according to an input signal 660 and interrupts the incident light 630 according to the signal 660. Accordingly, the reflected light 630 includes interruptions in the reflected light 665 corresponding to the input signal 665. Different encoding algorithms can be used to pass the data through the physical layer, for example, analog modulation or digital modulation. The reflected light 665 is then received by a receiver 614 at the base station 610. Although, the modulating surface 645 is the front surface in this embodiment, other embodiments do not modulate the front surface. Indeed, the embodiments of FIGS. 7 and 8 only modulate one or more of the three perpendicular surfaces.

The free-space communication system 700 shown in FIG. 7 uses a retroreflector 640 with a modulating surface 645 on one of the three perpendicular surfaces of the corner-cube retroreflector. FIG. 8 shows a retroreflector 640 with a modulating surface 645, 648 on at least two of the three perpendicular surfaces. Modulating thin-films may also be found on all three mutually perpendicular surfaces as well as all the surfaces of the retroreflector. Using multiple surfaces with thin-film membranes may increase the signal strength. The thin-film membrane(s) used on the retroreflector may comprise silicon carbide, for example.

Free-space communication systems 600, 700, 800 also permit targeted communication in one embodiment. The reflected beam of light 635 is reflected directly back toward the base station 610. Accordingly, the remote station 620 does not broadcast signals to other stations, permitting a more secure and/or quiet communications link. The reflected beam of light is intended to be parallel to the incident beam of light. However, due to manufacturing tolerances and/or defects, the beam of light may diverge from a path parallel to the incident beam of light. A substantially parallel reflected beam of light may diverge up to 10 degrees from a path parallel to the incident beam of light.

Figure 9A:
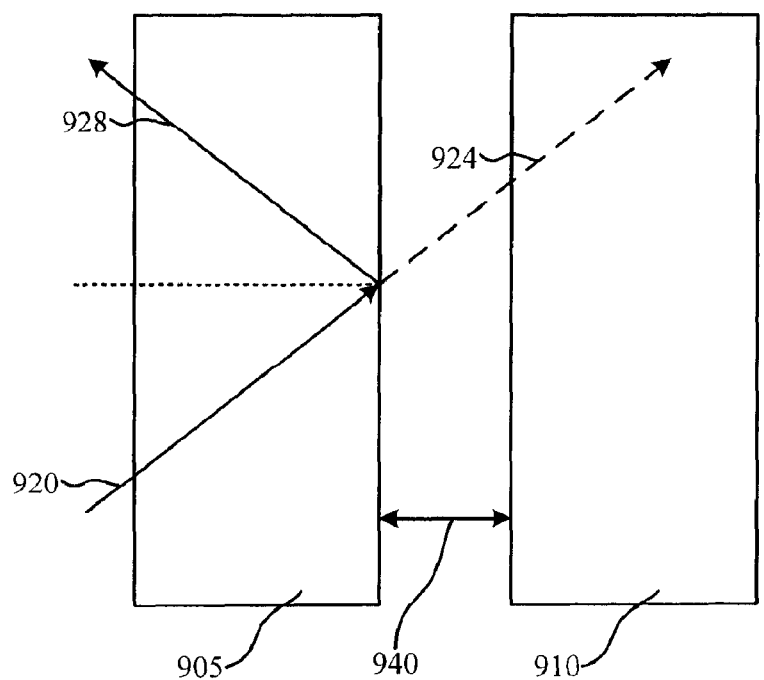
FIGS. 9A and 9B shows frustration of total-internal-reflection when two optical elements are brought into close proximity according to one embodiment of the invention.
Figure 9B:
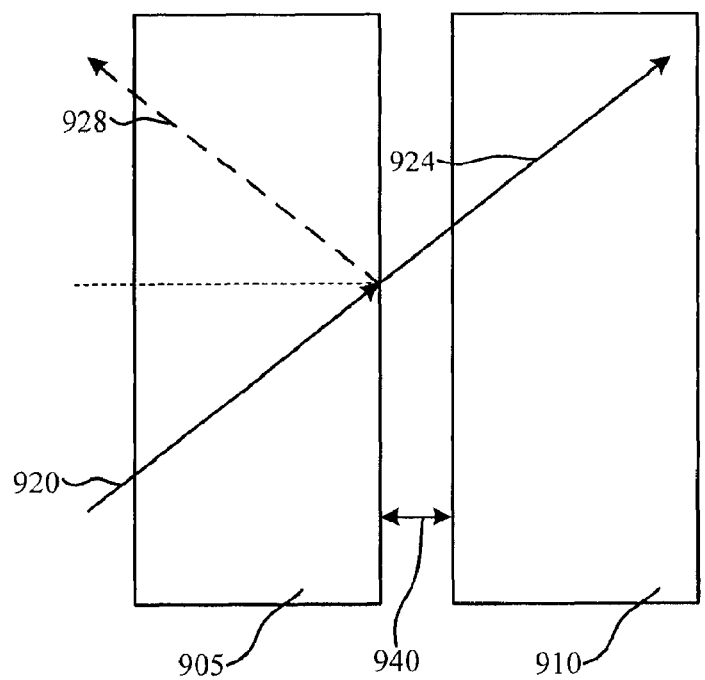

As shown in FIGS. 9A and 9B, total internal reflection within the retroreflector 905 is frustrated at the surface of the retroreflector 905 when a thin-film membrane 910, which has a higher coefficient of refraction than the surrounding area, approaches the surface of the retroreflector 905. FIG. 9A shows the thin-film membrane 910 far enough from the surface of the retroreflector 905 such that incident light 920 is totally reflected 928 and none of the light is lost to the thin-film membrane 924. As the thin-film membrane 910 approaches the surface of the retroreflector 905, as shown in FIG. 9B, total internal reflection is frustrated and some light propagates from the retroreflector into the thin-film membrane 910. As the distance 940 between the thin-film membrane 910 and the retroreflector 905 decreases the amount of incident light that is lost 924 also increases in this embodiment.

The distances between the surface of the retroreflector and the thin-film membrane used to reflect or frustrate the incident light depends on the wavelength of light used by the system. In one embodiment, the gap is a fraction of the wavelength of light the retroreflector is meant to modulate. For example, for light around 1550 nm, the resting distance between the retroreflector 905 and the thin-film membrane 910 is between 5 nm to 300 nm. For example, in an another embodiment of the invention for light at 1550 nm the distance between the retroreflector 905 and the thin-film membrane is between 50 nm to 250 nm. In another embodiment of the invention for light at 1550 nm the distance between the retroreflector surface 905 and the thin-film membrane is between 75 nm to 150 nm.

Figure 10A:
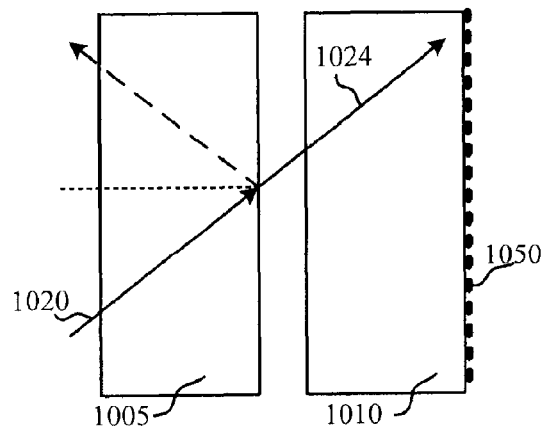
FIGS. 10A, 10B, 10C and 10D show a variety of schemes to reduce reflection from within the thin-film membrane according to another embodiment of the present invention.

FIGS. 10A, 10B, 10C and 10D show a variety of embodiments that minimize total internal reflection with the thin-film membrane 1010. FIG. 10A shows a thin-film membrane 1010 with diffraction grating 1050 on a back surface opposite the retroreflector 1005. The diffraction grating 1050 can be a transmission or reflection diffraction grating. The diffraction grating 1050 scatters light incident on the back surface of the thin-film membrane according to well defined maxima and minima depending on the wavelength of the light. The grating 950 may intermittently reduce the light reflected back into the retroreflector 1005 and back toward the source.

Figure 10B:
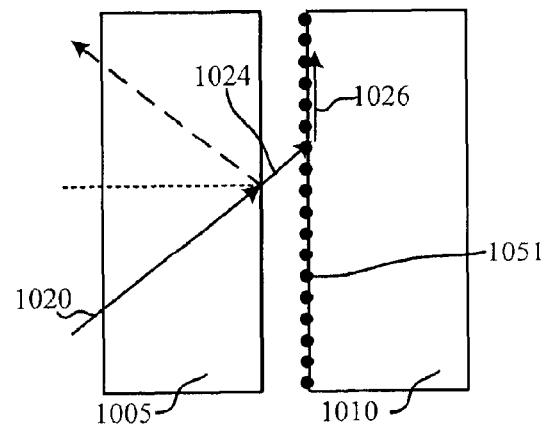

FIG. 10B shows an embodiment of a thin-film membrane 1010 with surface plasmon absorber 1051 on the surface of the thin-film membrane 1010 nearest the retroreflector 1005. The surface plasmon absorber 1051 may comprise a thin layer of silver gold, copper, titanium, or chromium on a dielectric material, such as, for example, glass, plastic or silicon, with a dielectric constant of opposing signs. The surface plasmon absorber 1051 translates incident light 1024 into a surface electromagnetic wave 1026 that travels along the surface of the interface between the surface plasmon absorber 1051 and the dielectric material. The body of the thin-film membrane may comprise the dielectric material. Thus, any thin-layer of metal disposed on a dielectric material with a dielectric constant sign that is opposite to the dielectric sign of the underlying thin membrane may be used to form the surface plasmon absorber 1051. For example, a metal with a positive dielectric constant may be used upon a thin membrane with a negative dielectric constant. A portion of light incident on the surface plasmon absorber 1051, rather than being reflected back toward the retroreflector 1005, is translated into a surface electromagnetic wave 1026.

Figure 10C:
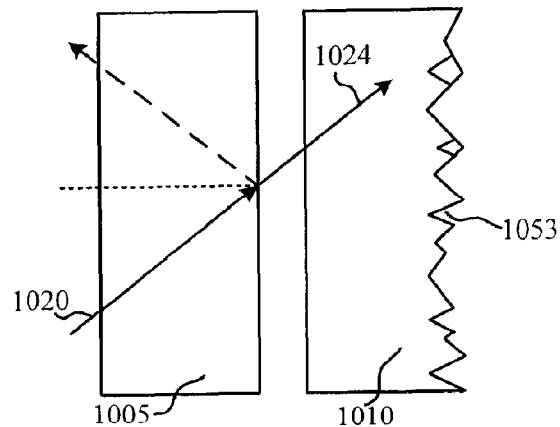

FIG. 10C shows an embodiment of a thin-film membrane 1010 with rough a scattering surface 1053 on a back side of the membrane 1010 furthest from the retroreflector 1005. The scattering surface 1053 scatters incident light 1024 in random directions thus greatly reducing the light reflected back into the retroreflector 1005 at an angle that will transmit the light back to the source.

Figure 10D:
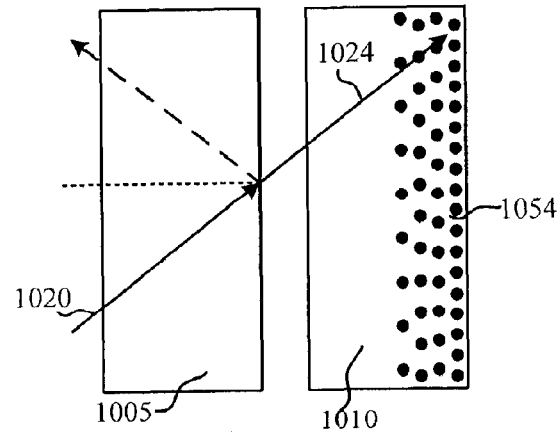

FIG. 10D shows another embodiment with a thin-film membrane 1010 including an absorptive volume 1054. The absorptive volume 1054 may include doping the thin-film membrane 1010 with chromium, boron, or nickel. Other optical absorbers may also be used. The absorptive volume 1054 may also include a gradient absorptive material 1054 as shown, such that the thin-film membrane 1010 gradually absorbs light 1024 as it passes through the membrane 1010. Other absorbing and/or scattering schemes may be used to minimize total internal reflection within the thin-film membrane 1010, such as using a resonant cavity absorber. Furthermore, multiple schemes may be adopted and implemented within the thin-film membrane 1010 to minimize the light reflected back into the retroreflector and back toward the source.

Due to the close proximity of the thin-film membrane to the surface of the retroreflector, van der Waals' forces may attract and adhere the thin-film membrane to the surface of the of the retroreflector. To combat these forces, the modulating retroreflector may be hermetically sealed within an oil-vapor environment to create pneumatic damping between the thin-film membrane and the surface of the retroreflector. The hermetic chamber may also be pressurized. The hermetic seal creates forces within the atmosphere that counteract the van der Waals' forces keeping the thin-film membrane from adhering to the surface of the retroreflector. The oil-like atmosphere used within the hermetic seal, may have an index of refraction smaller than both the retroreflector and the thin-film membrane in this embodiment. Other embodiments of the invention may include a gel-like substance between the thin-film membrane and the surface of the retroreflector. The gel-like substance would preferably have a low index of refraction and a sufficient compressibility to permit motion of the thin-film membrane.

Figure 11A:
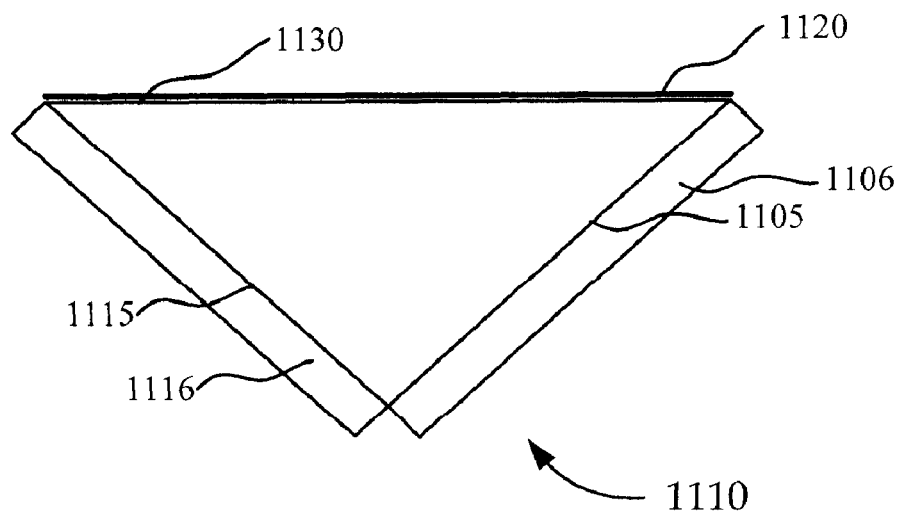
FIGS. 11A and 11B show retroreflectors with thin-film membranes disposed near different surfaces as well as a filter on the front surface of the retroreflector according to one embodiment of the invention.
Figure 11B:
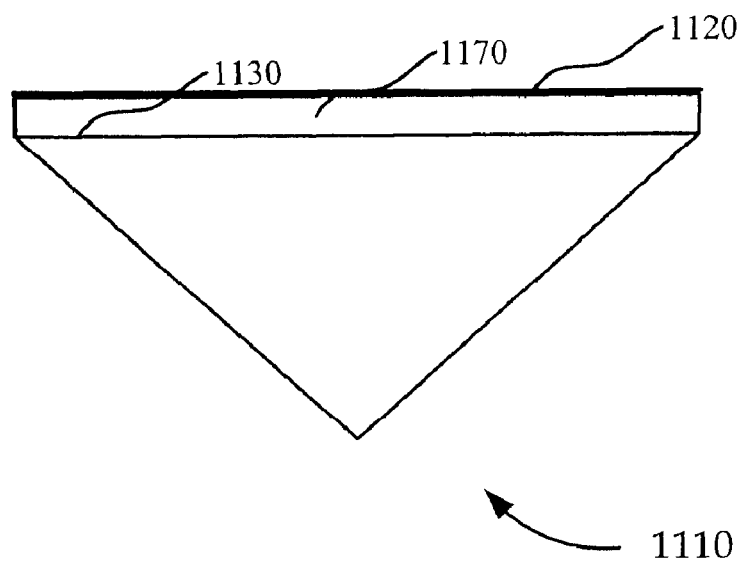

As shown in the embodiment of FIG. 11A, thin-film membranes 1106, 1116 may be placed relative to two or three of the mutually perpendicular surfaces 1105, 1115 of a solid retroreflector 1110. A membrane 1170 may also be placed across the front surface 1130 of the retroreflector 1110 as shown in FIG. 11B. FIGS. 11A and 11B also show a retroreflector 1110 with an optical filter 1120 on or relative to the front surface 1130 of the retroreflector 1110. The optical filter 1120 selectively blocks light of given wavelength or wavelength range while passing the remainder wavelengths of light. Those skilled in the art will recognize other substance that may be used within the chamber with the proper dampening and optical properties.

Another embodiment of the present invention includes a thin-film membrane 1170 on the front surface 1130 of a solid retroreflector 1110 operating in the Fabry-Perot mode. At the front surface 1130, light is both transmitted into the retroreflector 1110 and reflected from the front surface 1130. The reflected light is again reflected from the thin-film membrane 1170 and some of which is transmitted back into the retroreflector 1110. The phase difference between the first light transmitted into the retroreflector and the second light depends on the wavelength of light, the angle, the distance between the retroreflector and the thin-film membrane, and the index of refraction between. If the thin-film membrane is stationary the phase difference will be constant. However, by moving the thin-film membrane 1170 the phase difference varies according to the motion of the thin-film membrane. The thin-film membrane 1170 may be disposed n+¼ wavelengths from the front surface 1130 of the retroreflector 1110, where n is any integer. As the thin-film membrane 1170 moves up to ¼ of a wavelength the light is modulated by over 50%. A signal may be applied to the modulator and the phase changes transmit a signal back toward the source.

The thin-film membrane may also comprise a matrix of membranes. The membranes may include various membranes coupled to the retroreflector in any of a number of geometrical shapes. For example, a surface of the retroreflector may include a number of hexagonal thin-film membranes arranged in pattern throughout the surface. Moreover, the surface may comprise studs or connecting points where the membrane and the surface of the retroreflector are coupled. Another exemplary arrangement may include a pattern of pentagons and hexagons. These studs may also keep the thin-film membrane from being in direct contact. Another exemplary arrangement may comprise strips of thin-film membranes disposed on the surface of the retroreflector. Furthermore, the thin-film membrane may not cover the entire surface of the retroreflector in other embodiments.

In embodiment of the present invention a solid corner-cube retroreflector may include a thin-film membrane disposed relative to one of the mutually perpendicular surfaces of the corner-cube retroreflector. The thin-film membrane is placed as parallel to the surface of the retroreflector as possible, given the physical restrictions. Some variation in the distance between the retroreflector and the thin-film membrane may be permitted. The thin-film membrane and the surface of the retroreflector are intended to be parallel, but might vary from this configuration. The area between the surface of the retroreflector and the thin-film membrane may include a gas that keeps the thin-film membrane from contacting and adhering to the surface of the retroreflector. The retroreflector with thin-film membranes may also be housed within a hermetically sealed chamber containing a substance that keeps the thin-film membrane from adhering to the surface of the retroreflector.

A modulator may be coupled with the membrane. The modulator may comprise circuitry that introduces a variable electric field between the thin-film membrane and the surface of the retroreflector causing modulations in the distance between the thin-film membrane and a surface of the retroreflector. An electric field may be created between the thin-film membrane and the surface of the retroreflector by creating an electric potential between the surface of the retroreflector and the thin-film membrane. A small voltage may be applied to the thin-film membrane relative to the surface of the retroreflector that acts to either attract or repel the thin-film membrane from the surface of the retroreflector. Movement of the thin-film membrane changes the side of the retroreflector from reflecting to absorbing. The voltage may be modulated to produce one or more interruptions in the reflected light and thus embedding the reflected light with a signal. A transparent conductive coating may also be applied to the surface of the retroreflector and/or the thin membrane to hold and/or conduct charge, which creates an electric field.

In another embodiment, the modulator may cause a pressure differential in the chamber formed by the membrane and the surface to deflect the membrane proportional with the pressure. The pressure modulation may be electronically induced or manually induced by sound coupled by a tube that modulates the thin-membrane with compression waves incident on the thin-film membrane. In one embodiment, a pressure modulator may simply couple acoustic pressure from a voice, for example, to modulate the thin-film membrane. Mechanical modulators may also be used to vibrate the thin-film membrane. Other modulators may also be included that move the membrane causing frustration of total internal reflectance at the interface between the retroreflector surface and the thin-film membrane.

The thin membrane discussed in embodiments of the invention may comprise silicon carbide and/or may be doped with a metal or boron. The membrane is placed relative to the surface of the retroreflector such that as the thin-film membrane is vibrated or activated by the modulator the thin-film membrane moves approaches and recedes from the surface of the retroreflector. As the thin-membrane approaches the surface of the retroreflector, the presence of the membrane frustrates total internal reflectance within the retroreflector and permits light to be transmitted from within the retroreflector into the membrane. As the modulator presents a signal across the thin-film membrane causing frustration of total internal reflectance, interruptions in an incident beam of light may be introduced and the signal may be communicated back to a receiver. Other embodiments may frustrate total internal reflection when the membrane travels away from the surface, and perform total internal reflection when the membrane is at rest near the surface of the retroreflector.

While the principles of the disclosure have been described above in connection with specific apparatuses and methods, it is to be clearly understood that this description is made only by way of example and not as limitation on the scope of the disclosure.

What is claimed is:

1. A modulating corner-cube retroreflector, wherein the modulating corner-cube retroreflector is used for remote communications, comprising:
   a solid corner-cube retroreflector comprising a front surface and three mutually perpendicular surfaces, wherein the three mutually perpendicular surfaces include a first surface, a second surface and a third surface;
   a thin membrane disposed relative to at least one of the first surface, second surface, and third surface, wherein the thin membrane covers at least a portion of the surface; and
   a modulator adapted to cause the thin membrane to vibrate; wherein:
      the solid corner-cube retroreflector is configured to receive an incident beam of light from a source along a first path and is configured to return a reflected beam of light back towards the source along a second path that is substantially parallel to the first path;
      the thin membrane is configured to substantially frustrate total internal reflection of the incident beam of light when the thin membrane is moved relative to at least one surface of the retroreflector; and
      the modulator creates an electric field between at least one surface of the retroreflector and the thin membrane.

2. The modulating corner-cube retroreflector of claim 1, further comprising an optical filter, wherein the optical filter permits a substantially narrow wavelength band of light to enter the corner-cube retroreflector.

3. A modulating corner-cube retroreflector, wherein the modulating corner-cube retroreflector is used for remote communications, comprising:
   a solid corner-cube retroreflector comprising a front surface and three mutually perpendicular surfaces, wherein the three mutually perpendicular surfaces include a first surface, a second surface and a third surface;
   a thin membrane disposed relative to at least one of the first surface, second surface, and third surface, wherein the thin membrane covers at least a portion of the surface; and
   a modulator adapted to cause the thin membrane to vibrate; wherein:
      the solid corner-cube retroreflector is configured to receive an incident beam of light from a source along a first path and is configured to return a reflected beam of light back towards the source along a second path that is substantially parallel to the first path;
      the thin membrane is configured to substantially frustrate total internal reflection of the incident beam of light when the thin membrane is moved relative to at least one surface of the retroreflector; and
      the thin membrane comprises a first thin membrane, the modulating corner-cube retroreflector further comprising one or more additional thin membranes.

4. A modulating corner-cube retroreflector, wherein the modulating corner-cube retroreflector is used for remote communications, comprising:
   a solid corner-cube retroreflector comprising a front surface and three mutually perpendicular surfaces, wherein the three mutually perpendicular surfaces include a first surface, a second surface and a third surface;
   a thin membrane disposed relative to at least one of the first surface, second surface, and third surface, wherein the thin membrane covers at least a portion of the surface; and
   a modulator adapted to cause the thin membrane to vibrate; wherein:
      the solid corner-cube retroreflector is configured to receive an incident beam of light from a source along a first path and is configured to return a reflected beam of light back towards the source along a second path that is substantially parallel to the first path;
      the thin membrane is configured to substantially frustrate total internal reflection of the incident beam of light when the thin membrane is moved relative to at least one surface of the retroreflector; and
      the modulator comprises a sound conducting tube.

5. A modulating corner-cube retroreflector, wherein the modulating corner-cube retroreflector is used for remote communications, comprising:
   a solid corner-cube retroreflector comprising a front surface and three mutually perpendicular surfaces, wherein the three mutually perpendicular surfaces include a first surface, a second surface and a third surface;
   a thin membrane disposed relative to at least one of the first surface, second surface, and third surface, wherein the thin membrane covers at least a portion of the surface; and
   a modulator adapted to cause the thin membrane to vibrate; wherein:
      the solid corner-cube retroreflector is configured to receive an incident beam of light from a source along a first path and is configured to return a reflected beam of light back towards the source along a second path that is substantially parallel to the first path;
      the thin membrane is configured to substantially frustrate total internal reflection of the incident beam of light when the thin membrane is moved relative to at least one surface of the retroreflector; and
      the thin membrane comprises silicon carbide.

6. A modulating corner-cube retroreflector, wherein the modulating corner-cube retroreflector is used for remote communications, comprising:

a solid corner-cube retroreflector comprising a front surface and three mutually perpendicular surfaces, wherein the three mutually perpendicular surfaces include a first surface, a second surface and a third surface;

a thin membrane disposed relative to at least one of the first surface, second surface, and third surface, wherein the thin membrane covers at least a portion of the surface; and a modulator adapted to cause the thin membrane to vibrate; wherein:

the solid corner-cube retroreflector is configured to receive an incident beam of light from a source along a first path and is configured to return a reflected beam of light back towards the source along a second path that is substantially parallel to the first path;

the thin membrane is configured to substantially frustrate total internal reflection of the incident beam of light when the thin membrane is moved relative to at least one surface of the retroreflector; and the thin membrane is doped with metal.

7. The modulating corner-cube retroreflector of claim 6, wherein the metal is selected from the group consisting nickel and chromium.

8. A modulating corner-cube retroreflector, wherein the modulating corner-cube retroreflector is used for remote communications, comprising:

a solid corner-cube retroreflector comprising a front surface and three mutually perpendicular surfaces, wherein the three mutually perpendicular surfaces include a first surface, a second surface and a third surface;

a thin membrane disposed relative to at least one of the first surface, second surface, and third surface, wherein the thin membrane covers at least a portion of the surface;

a modulator adapted to cause the thin membrane to vibrate; and a substance between the thin membrane and the retroreflector, wherein the substance prevents the thin membrane from adhering to the retroreflector;

wherein:

the solid corner-cube retroreflector is configured to receive an incident beam of light from a source along a first path and is configured to return a reflected beam of light back towards the source along a second path that is substantially parallel to the first path;

the thin membrane is configured to substantially frustrate total internal reflection of the incident beam of light when the thin membrane is moved relative to at least one surface of the retroreflector.

9. The modulating corner-cube retroreflector of claim 8, wherein the substance comprises oil.

10. A modulating corner-cube retroreflector, wherein the modulating corner-cube retroreflector is used for remote communications, comprising:

a solid corner-cube retroreflector comprising a front surface and three mutually perpendicular surfaces, wherein the three mutually perpendicular surfaces include a first surface, a second surface and a third surface;

a first thin membrane disposed relative to at least one of the first surface, second surface, and third surface, wherein the thin membrane covers at least a portion of the surface;

a modulator adapted to cause the first thin membrane to vibrate;

a second thin membrane, wherein the second thin membrane is disposed relative and substantially parallel to one of the first surface, second surface, and third surface;

wherein:

the solid corner-cube retroreflector is configured to receive an incident beam of light from a source along a first path and is configured to return a reflected beam of light back towards the source along a second path that is substantially parallel to the first path;

the first thin membrane is configured to substantially frustrate total internal reflection of the incident beam of light when the first thin membrane is moved relative to at least one surface of the retroreflector.

11. The modulating corner-cube retroreflector of claim 10, wherein the modulator is adapted to move the second thin membrane.

12. The modulating corner-cube retroreflector of claim 10, further comprising a third thin membrane, wherein the third thin membrane is disposed relative and substantially parallel to one of the first surface, second surface, and third surface.

13. The modulating corner-cube retroreflector of claim 12, wherein the modulator is adapted to move the third thin membrane.

14. A method for receiving a first beam of light along a first path and returning a second beam of light along a second path, wherein the second path is substantially parallel to the first path, the method comprising steps of:

receiving the first beam of light with a solid corner-cube retroreflector, wherein the first beam of light travels along the first path;

reflecting light with the solid corner-cube retroreflector;

vibrating a thin membrane disposed near a surface of the retroreflector to intermittently frustrate total internal reflectance of the first beam of light to produce the second beam of light; and returning the second beam of light, wherein:

the second beam of light travels along the second path, the vibrating step causes modulation of information on the second beam of light, and the vibrating step is caused by sound pressure.

* * * * *